United States Patent Office 3,755,491
Patented Aug. 28, 1973

3,755,491
PROCESS FOR PRODUCING 4-METHYL-1-PENTENE
Harukichi Hashimoto, Sendai, Japan, assignor to Idemitsu Petrochemical Co., Ltd.
No Drawing. Filed May 1, 1972, Ser. No. 249,253
Claims priority, application Japan, Feb. 3, 1972, 47/11,870
Int. Cl. C07c 3/20
U.S. Cl. 260—683.15 E    3 Claims

ABSTRACT OF THE DISCLOSURE

Propylene is dimerized in the presence of a catalyst composed of potassium, copper and a potassium alkoxide of an aliphatic saturated primary or secondary alcohol. The dimerization is carried out in an inert gas atmosphere, at 100°–250° C., and in the substantial absence of oxygen and water. 4-methyl-1-pentene is produced with high selectivity.

---

This invention relates to a novel process for producing 4-methyl-1-pentene by dimerizing propylene.

More particularly, the invention pertains to a process for synthesizing 4-methyl-1-pentene by dimerizing propylene in the presence of a catalyst composed of potassium, copper and a potassium alkoxide.

As to the dimerization reaction of propylene, there has heretofore been known a process using a catalyst composed of (a) potassium or a potassium-sodium mixture and (b) a metal selected from the group consisting of copper, silver and magnesium (Japanese patent publication No. 40,249/1971). According to the above-mentioned process, however, the reaction rate is low, and for example, where the reaction is effected in a heptane solvent at 180° C. for 5 hours, the conversion of propylene is not more than 15% and the selectivity for 4-methyl-1-pentene is at most 87%. The selectivity for 4-methyl-1-pentene referred to herein means the content of 4-methyl-1-pentene in the resulting dimers, i.e. $C_6$-olefins. Further, I have disclosed a process using a potassium-copper catalyst which has previously been heat-treated in an aliphatic hydrocarbon solvent in an inert atmosphere in the presence or absence of propylene (Japanese patent publication No. 2,603/1972). According to the said process, the reaction rate increases and the conversion of propylene becomes higher, but the selectivity for 4-methyl-1-pentene cannot be enhanced and there is observed such a tendency that the selectivity for 4-methyl-1-pentene is rather lowered if the conversion of propylene is made higher.

A principal object of the present invention is to provide a novel process for producing 4-methyl-1-pentene by dimerizing propylene in the presence of a catalyst composed of potassium, copper and a certain potassium alkoxide, thereby more enhancing the selectivity for 4-methyl-1-pentene and/or increasing the reaction rate of propylene than in the conventional process.

Other objects and advantages of the invention will become apparent from the description made below.

I have now found that when a catalyst prepared by adding a certain potassium alkoxide to a mixture of potassium and copper is used, the selectivity for 4-methyl-1-pentene can be increased ordinarily to 90% or more, and in particular cases to 95% or more, and such high selectivity for 4-methyl-1-pentene can be maintained even when the conversion of propylene is high. I have further found that the reaction rate of propylene tends to increase, in general, by addition of the above-mentioned potassium alkoxide.

The potassium alkoxide, which is useful in the present invention, includes potassium alkoxides which are derived from aliphatic saturated primary or secondary alcohols and which are stable under the reaction conditions for dimerization of propylene. As for the said primary and secondary alcohols, those having 1 to 12 carbon atoms are particularly preferable. Examples of such alcohols include methanol, ethanol, 1-propanol, isopropanol, 1-butanol, isobutanol, sec-butanol, 1-pentanol, isoamyl alcohol, 1-hexanol, 2-hexanol, cyclohexanol, 1-octanol, 1-decanol and the like. Potassium alkoxides derived from aliphatic tertiary alcohols are not effective for use in the present invention.

In the present invention, the potassium alkoxide is used in a proportion of 0.1 to 5 moles, preferably 0.2 to 1 mole, per mole of the potassium used as a catalyst component. A potassium alkoxide used in the present invention may also be prepared in a reactor for dimerization of propylene by reacting potassium with the corresponding alcohol in the presence of potassium and copper which are catalyst components, and the resulting alkoxide may be used as it is in the reaction. In this case, however, the hydrogen generated during the reaction should necessarily be removed from the reactor as much as possible.

The reaction of dimerizing propylene in the presence of the catalyst according to the present invention is carried out in a nitrogen or the like inert gas atmosphere at 100° to 250° C., preferably at 150° to 200° C., in the substantial absence of oxygen and water, in general.

The present invention is illustrated in further detail hereinbelow with reference to examples.

EXAMPLE 1

A mixture comprising 70 ml. of heptane freed of water, 4.0 g. of potassium and 3.2 g. of copper powder was fed to a 300 ml. stainless steel-made electromagnetic stirring type autoclave. To the mixture was added 1.6 g. of methanol which had been freed of water by means of a syringe under nitrogen blanket, and then the autoclave was closed. After substituting the air in the autoclave by nitrogen, the mixture was heated at 60° to 70° C. for 30 minutes and then at about 100° C. for 30 minutes to completely react the methanol with the potassium, whereby potassium methoxide was formed. After cooling the autoclave to room temperature, the nitrogen substitution was repeated to remove from the autoclave the hydrogen formed in the above-mentioned reaction. Subsequently, 58.0 g. of propylene was introduced under pressure into the autoclave then heated with stirring at 180° C. for 3 hours. After cooling the autoclave to room temperature, unreacted propylene was removed, and the reaction liquid in the autoclave was recovered and then determined by means of gas chromatography. The conversion of propylene was 27%, and the selectivity for 4-methyl-1-pentene was 92%.

The gas chromatography was effected under such conditions that the column used was 3 m. in length and had been packed with the solid phase of Diasolid M (produced by Nippon Chromato Industrial Co.) and with the liquid phase of Silicone DC 550 (produced by Nippon Chromato Industrial Co.), the temperature adopted was 50° C., the carrier gas used was hydrogen, and the gas flow rate was 50 ml./min. The determination was conducted by use of the calibration curve which had been formed previously.

EXAMPLE 2

In the same manner as in Example 1, a catalyst was prepared from 3.0 g. of potassium, 3.2 g. of copper powder and 0.8 g. of methanol in 70 ml. of heptane. Using the thus prepared catalyst, 53 g. of propylene was reacted at 180° C. for 3.5 hours. As the result, the conversion of propylene was 41%, and the selectivity for 4-methyl-1-pentene was 91%.

EXAMPLE 3

A mixture comprising 20 ml. of heptane, 1.0 g. of potassium and 1.5 g. of 1-propanol was charged into a flask, and heated in a nitrogen atmosphere at about 100° C. for 1.5 hours to prepare about 2.5 g. of potassium propoxide. The thus prepared potassium propoxide was fed together with the solvent heptane used to the same autoclave as in Example 1, and an additional heptane was introduced into the autoclave to make the total amount of heptane 70 ml. To the autoclave were further added 2.0 g. of potassium and 3.2 g. of copper powder, and then the autoclave was closed. After purge of the autoclave with nitrogen, 64 g. of propylene was introduced under pressure into the autoclave and reacted at 180° C. for 4.5 hours. As the result, the conversion of propylene was 39%, and the selectivity for 4-methyl-1-pentene was 93%.

EXAMPLE 4

In the same autoclave as in Example 1, a catalyst was prepared in the same manner as in Example 1 by heating in a nitrogen atmosphere at about 100° C. for 1.5 hours a mixture comprising 70 ml. of heptane, 4.0 g. of potassium, 3.2 g. of copper powder and 3.0 g. of 1-propanol. After substituting the formed hydrogen by nitrogen, 64 g. of propylene was introduced under pressure into the autoclave, and reacted at 180° C. for 3 hours. As the result, the conversion of propylene was 47%, and the selectivity for 4-methyl-1-pentene was 92%.

EXAMPLE 5

In the same manner as in Example 4, a catalyst was prepared from 3.0 g. of potassium, 3.2 g. of copper powder and 1.65 g. of 1-butanol in 70 ml. of heptane. Subsequently, 52 g. of propylene was fed to the autoclave and reacted at 180° C. for 3 hours. As the result, the conversion of propylene was 48%, and the selectivity for 4-methyl-1-pentene was 97%.

EXAMPLE 6

In the same manner as in Example 4, a catalyst was prepared by heating a mixture comprising 70 ml. of heptane, 2.5 g. of potassium, 3.2 g. of copper powder and 0.75 g. of isopropanol at 80 to 85° C. for 1 hour and then at about 100° C. for additional 1 hour. Subsequently, 53 g. of propylene was fed to the autoclave and reacted at 180° C. for 2 hours. As the result, the conversion of propylene was 43%, and the selectivity for 4-methyl-1-pentene was 89%.

EXAMPLE 7

In the same manner as in Example 4, a catalyst was prepared from 2.5 g. of potassium, 3.2 g. of copper powder and 0.92 g. of sec-butanol in 70 ml. of heptane. Subsequently, 61 g. of propylene was fed to the autoclave and reacted at 180° C. for 3 hours. As the result, the conversion of propylene was 44%, and the selectivity for 4-methyl-1-pentene was 84%.

EXAMPLE 8

In the same manner a sin Example 4, a catalyst was prepared from 4.0 g. of potassium, 3.2 g. of copper powder and 3.7 g. of isobutanol in 70 ml. of heptane. Subsequently, 50 g. of propylene was fed to the autoclave and reacted at 180° C. for 2.5 hours. As the result, the conversion of propylene was 61%, and the selectivity for 4-methyl-1-pentene was 90%.

EXAMPLE 9

In the same manner as in Example 4, a catalyst was prepared from, 3.0 g. of potassium, 3.2 g. of copper powder and 3.95 g. of 1-decanol in 70 ml. of heptane. Subsequently, 55 g. of propylene was fed to the autoclave and reacted at 180° C. for 3 hours. As the result, the conversion of propylene was 40, and the selectivity for 4-methyl-1-pentene was 90%.

What I claim is:

1. A process for producing 4-methyl-1-pentene, which comprises dimerizing propylene in the presence of a catalyst composed of (a) potassium, (b) copper and (c) a potassium alkoxide derived from an aliphatic saturated primary or secondary alcohol.

2. A process for producing 4-methyl-1-pentene as claimed in claim 1, wherein the aliphatic saturated primary or secondary alcohol is selected from the group consisting of methanol, ethanol, 1-propanol, isopropanol, 1-butanol, isobutanol, sec-butanol, 1-pentanol, isoamyl alcohol, 1-hexanol, 2-hexanol, cyclohexanol, 1-octanol and 1-decanol.

3. A process for producing 4-methyl-1-pentene as claimed in claim 1, wherein the dimerization is carried out in an inert gas atmosphere at 100°–250° C. in the substantial absence of oxygen and water.

References Cited
UNITED STATES PATENTS 3,251,895 5/1966 Wilkes _____ 260—683.15 E
3,622,648 11/1971 Schloemer et al. _ 260—683.15 E PAUL M. COUGHLAN, JR., Primary Examiner U.S. Cl. X.R.

252—430